Jan. 20, 1942.    D. H. MONTGOMERY    2,270,661
SPRING COLLET
Filed Jan. 12, 1939
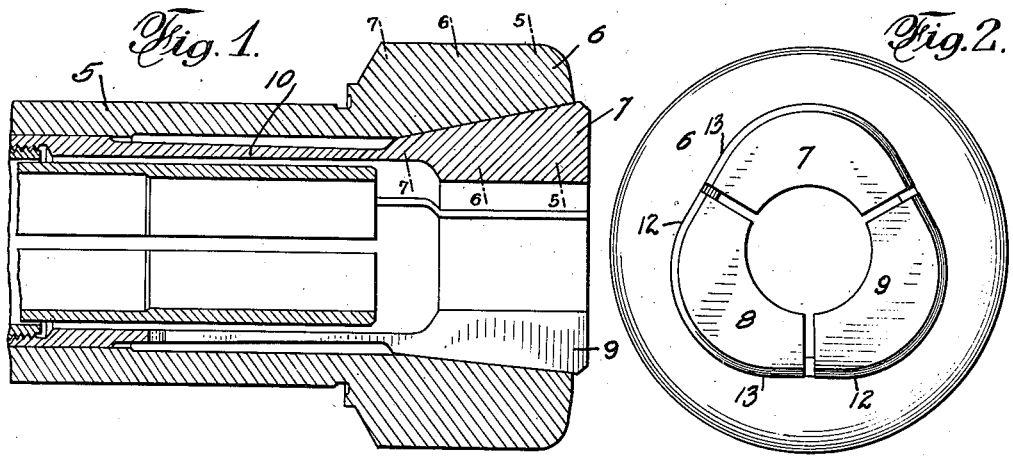
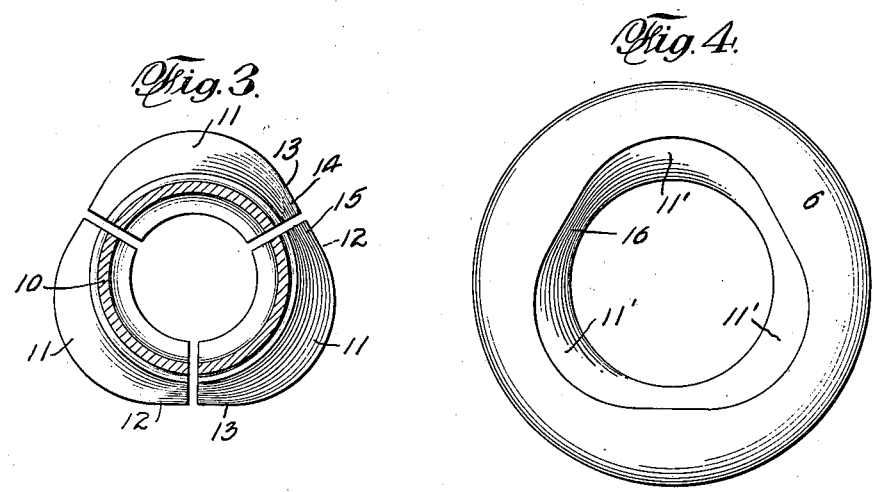
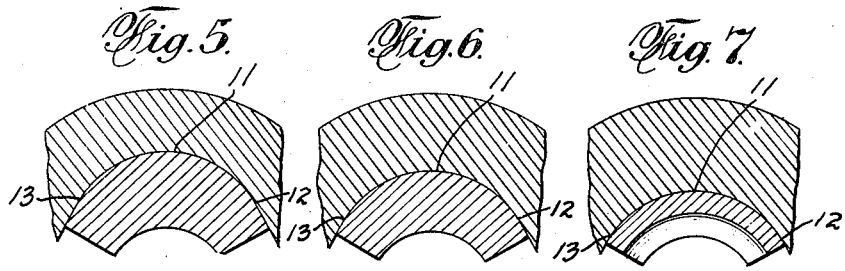
INVENTOR
DONALD H. MONTGOMERY
BY
ATTORNEYS Patented Jan. 20, 1942

2,270,661

UNITED STATES PATENT OFFICE 2,270,661

SPRING COLLET

Donald H. Montgomery, West Hartford, Conn., assignor to The New Britain Machine Company, New Britain, Conn., a corporation of Connecticut Application January 12, 1939, Serial No. 250,495

7 Claims. (Cl. 279—51)

My invention relates to a chuck and more specifically to an improved form of spring collet.

The conventional form of spring collet now widely used comprises a plurality of jaws, the outer working surfaces of which form a circular cone. The collet seat in the spindle nose is of corresponding conical form. In such conventional collets it will be clear that the collet can fit its seat in only one longitudinal position of the collet on its seat. Relative longitudinal movement of the collet on its seat in one direction will cause each jaw to bear only along a longitudinally extending line at the middle of each collet jaw. Movement of the collet from its fitting position in the opposite direction will cause each jaw to engage the seat only at the edges of the jaw and the central portion of the jaw will be free of the seat. Conventional collets are therefore usually designed so as to cause the collet to fit its seat properly in only the single instance where the collet is gripping stock of minimum diameter. Variations in commercial stock are such that the collet is usually caused to grip stock of greater diameter than the minimum and, as heretofore indicated, the collet then cannot fit its seat properly and theoretically each jaw engages its seat with a line contact. Such line contact under heavy pressure may be expanded into a more or less extensive surface contact but only at the expense of a distortion of the jaw or spindle nose, or both. Such distortion of the spindle nose is disadvantageous since it is caused to assume an out of round cross-section, which out of roundness may extend back to the spindle bearing and cause unequal pressures and rapid wear and failure of the spindle bearing. Furthermore the gripping of the jaws of the conventional collet when engaging stock of any size other than the one specific size for which the collet is designed tends to cause the maximum pressure and wear between the collet and its seat to occur at one end of the collet. For example, with a drawback type of collet on oversize stock the maximum pressure is at the front of the collet jaws and, as stated, is along a line down the center of each jaw.

It is an object of my invention to provide an improved form of collet to overcome or at least substantially minimize the objections heretofore noted to conventional collets.

It is a more specific object to provide an improved form of collet in which substantially uniformly distributed bearing pressures between collet and seat will be obtained for all size variations of stock for which the collet is designed.

Another specific object is to provide an improved form of collet wherein the pressure between the collet jaws and stock will be substantially uniformly distributed for all stock sizes.

Another object is to provide an improved form of collet to overcome many of the disadvantages of conventional collets and which is relatively simple in construction and to manufacture, and effective in use.

Other objects and various features of novelty and invention will be hereinafter pointed out or will become apparent to those skilled in the art.

In the drawing which shows, for illustrative purposes only, one preferred form of the invention—

Fig. 1 is a central, vertical section, taken substantially on a vertical plane through Fig. 2, illustrating a spindle and my improved collet;

Fig. 2 is a front view in elevation of the collet and spindle nose shown in Fig. 1;

Fig. 3 is a sectional view through the collet sleeve looking forwardly as viewed in Fig. 1;

Fig. 4 is a front view in elevation of the spindle nose, illustrating the collet seat.

Figs. 5, 6 and 7 are fragmentary, sectional views, taken substantially in the planes of the lines 5—5, 6—6 and 7—7 respectively of Fig. 1.

The invention has been illustrated and will be described as embodied in a drawback type of collet, although the invention may be otherwise embodied.

In said drawing, the spindle 5, which will ordinarily be mounted in bearings (not shown) has a nose 6 with a collet seat formed therein. The collet itself may comprise a plurality of jaws 7—8—9 formed by slitting the collet sleeve 10 and jaw portions as is now well understood. Each jaw is provided with a surface which embraces a substantial portion of the working surface of the jaw and is of substantially the same section from front to rear. The collet seat is similarly formed to properly receive the jaws. The jaws, as is usual, are tapered from end to end and of course the seat in the spindle nose is similarly tapered.

In the specific embodiment illustrated each jaw is provided on its exterior with a cylindrical surface 11 inclined to the axis of the chuck and of substantially the same cross-section throughout its working surface from end to end. As is illustrated particularly in Figs. 5, 6 and 7, the cylindrical cross-section of the outer working surface is the same at all points. Corresponding seats 11' in the spindle nose are of like cross-section throughout their seating surfaces from end to end. The circumferential extent of the cylindrical surfaces is preferably as extensive as is consistent with the design of the collet. In the form illustrated and as will be clear particularly from Fig. 7, the cylindrical surface 11 extends circumferentially so as to take up almost the entire circumferential surface of each jaw at its rear, that is to say, the cylindrical surface extends from about the point 12 to the point 13 in Fig. 7. These corresponding points are shown also in Figs. 5 and 6. The seats 11' in the spindle nose are of the same cross section as the interfitting parts of the jaws and, as will be clear, comprise cylindrical surfaces extending from front to rear throughout their working surfaces.

Since the jaws are tapered from end to end it will be clear that between the cylinder surfaces inclined to axis of the collet there will be other surfaces on adjacent jaws, at least at the larger diameter of the collet. The cylindrical surfaces on the jaws merge into such other surfaces 14—15 which, in the preferred form, are plane surfaces merging into and lying substantially tangent to the curved surfaces 11 of the jaws. The surfaces 14—15, as will be clear, are of substantially triangular form extending from front to rear. The seats 11'—11' as stated are of substantially the cylindrical form of the working surfaces of the jaws, and a surface preferably in the form of a plane 16 joins the surfaces 11'—11' and such plane surface 16 as in the case of the jaws is preferably tangent to the cylindrical portions and due to the inclination of the cylindrical portions is of substantially triangular form, as will be seen in Fig. 4.

Now when the collet is operated to grip a piece of stock the cylindrical surfaces on the collet and in the collet seat will fit throughout their circumferential and axial extent for all relative positions between the collet and spindle and properly grip all sizes of stock for which the collet is designed. The plane surfaces will also remain in engagement, but as a practical matter such surfaces are not substantially relied upon and may be in clearance relation to each other. The pressure of the jaws on the spindle nose will be substantially evenly distributed over a very extensive surface so as to minimize distortion of the spindle nose and distribute the pressure so as to reduce unit pressures and very substantially reduce wear. The chucking pressure on the stock will be substantially distributed throughout the axial extent of the gripping surfaces when the latter extend axially.

In the preferred form illustrated the working surfaces of the jaws and seat have been shown as cylindrical and are merged with plane surfaces. It is to be understood, however, that that particular configuration may be varied; for example, the cylindrical surfaces might be elliptical in section rather than circular, and the plane surfaces might be curved.

While the invention has been described in considerable detail and a preferred form illustrated, it is to be understood that various changes may be made within the scope of the invention as defined in the appended claims.

I claim:

1. A collet including a plurality of externally longitudinally-tapered jaws, a substantial portion of the outer surface of each jaw being convexly curved transversely from the narrow end of its outer surface to the outer end thereof and such curved portion being of the same width and transverse contour from the rear end through the front end of said external surface, such curved portion being less than semicircular in extent.

2. A collet including a plurality of jaws tapered from one end to the other, the external surface of each jaw being of arcuate transverse contour throughout a substantial portion of its outer surface and of the same transverse contour throughout its external working face from its narrow end to the other, said arcuate surface being less than semi-circular in extent.

3. A collet including a plurality of jaws tapered from end to end, the external surface of each jaw including a central longitudinally extending cylindrical surface and a substantially plane surface tangent to said cylindrical surface.

4. A collet including a plurality of jaws tapered from end to end, each jaw including at its exterior a central longitudinally extending cylindrical surface extending from rear to front and a generally triangular plane surface extending from rear to front, said plane surface being substantially tangent to and merging with said cylindrical surface.

5. A collet including a plurality of jaws tapered externally from end to end, the outer surface of each jaw including at its exterior a central longitudinally extending curved surface of substantially the same width and transverse contour from the smaller to the larger end of the jaw and another surface merging with and substantially tangent to said curved surface at the side thereof.

6. A collet including a plurality of jaws, the external surfaces of said jaws comprising central longitudinally extending curved surfaces of substantially the same transverse contour from end to end and generally triangular surfaces merging with said curved surfaces.

7. A drawback collet structure including a spindle comprising a sleeve and a nose thereon provided with a flared collet seat having a round rear end and a plurality of concave cylindrical surfaces inclined outwardly from rear to front and having throughout their length substantially the same transverse contours as the corresponding parts of the round rear end of the collet seat; and a collet including a plurality of jaws having external working surfaces with parts to fit said cylindrical surfaces throughout the range of forward and rearward movement of said jaws, and resilient jaw-carrying arms spaced from the inner surface of said sleeve and serving to hold said jaws in effective engagement with said seat throughout the longitudinal movement of said jaws.

DONALD H. MONTGOMERY.